United States Patent [19]

Getgen

[11] 3,859,469

[45] Jan. 7, 1975

[54] COMBINATION HYBRID AND FREQUENCY DIVISION MULTIPLEXING CIRCUIT

[75] Inventor: Lawrence E. Getgen, Redwood City, Calif.

[73] Assignee: GTE Automatic Electric Laboratories Incorporated, Northlake, Ill.

[22] Filed: Aug. 29, 1973

[21] Appl. No.: 392,720

Related U.S. Application Data

[63] Continuation-in-part of Ser. No. 349,572, April 9, 1973, Pat. No. 3,833,772.

[52] U.S. Cl. ........................ 179/15 AA, 179/15 FD

[51] Int. Cl. ........................ H04j 1/06

[58] Field of Search ......... 179/15 FD, 15 FS, 2.5 R, 179/15 A, 15 AA

[56] References Cited

UNITED STATES PATENTS

| | | | |
|---|---|---|---|
| 2,408,462 | 10/1946 | Wise | 179/15 FD |
| 3,518,376 | 6/1970 | Kamen | 179/15 FS |
| 3,577,202 | 5/1971 | Brightman | 179/2.5 R |

FOREIGN PATENTS OR APPLICATIONS

| | | | |
|---|---|---|---|
| 1,258,905 | 1/1968 | Germany | 179/15 AA |

OTHER PUBLICATIONS

IBM Journal, March 1965; "A New Method For Frequency Division Multiplexing...," P. M. Thrasher, pp. 137–140.

Transmission Systems for Communications; Staff, Bell Telephone Laboratories; Copyright 1959; pp. 5–1 to 5–17.

Bell Telephone System Technical Publications; Monograph 2296, "Type-On Carrier Telephone," Fracassi et al.; Copyright 1954.

*Primary Examiner*—David L. Stewart
*Attorney, Agent, or Firm*—Russell A. Cannon; Leonard R. Cool; T. C. Jay, Jr.

[57] ABSTRACT

A terminal having a plurality of lines in a two-way communication system. A plurality of resonant transfer means is used for effecting hybrid separation of the several lines into individual transmit and receive paths. The several hybrids use resonant transfer gates and bandpass filters selecting different portions of the frequency spectrum. As a phenomenon of the system, the line signal, e.g., voice current, is repeated as sidebands located at multiples of the sampling frequency of the resonant transfer gates. Frequency division multiplexing of the hybrid paths is accordingly attained.

29 Claims, 2 Drawing Figures

Patented Jan. 7, 1975

3,859,469

2 Sheets-Sheet 1

COMBINATION HYBRID AND FREQUENCY DIVISION MULTIPLEXING CIRCUIT

CROSS-REFERENCE TO RELATED APPLICATION

The present application is a continuation-in-part of my application Ser. No. 349,572 filed Apr. 9, 1973, now U.S. Pat. No. 3,833,772, issued Sept. 3, 1974 for TIME DIVISION HYBRID CIRCUIT AND METHOD.

BACKGROUND OF THE INVENTION

1. Field of the Invention

The invention relates to two-way communication systems, to the use of hybrid circuits therein for separating line signals into individual transmit and receive paths, and to the simultaneous transmission of a plurality of line signals over a single high frequency line by frequency division multiplexing.

2. Description of the Prior Art

Hybrid circuits are used in telephone and other communication systems for separating the normal two-way line communication into individual unidirectional paths, commonly referred to as the transmit and receive paths, for signals emanating from the opposite ends of the line. One of the important uses of the hybrid circuit is for the introduction into either or both of the transmit and receive paths of amplifiers, which are inherently unidirectional, for restoring the strength of signals attenuated by transmission losses.

Conventional hybrids are of the transformer type operating on the principle of magnetic field balancing or cancellation. Such hybrids ideally have a 3 dB loss in the transmission path since one-half of the transmitted power is always lost either in the balancing network for the receive-to-line direction of transmission or in the receive line termination for the line-to-transmit direction of transmission. Practically, the transmission loss is much higher, in the order of 4.5 dB. Furthermore, the transhybrid loss, that is the loss from the receive port to the transmit port, of a conventional hybrid depends upon the hybrid balance, which in turn depends upon the matching of the hybrid balance network to the termination at the line port and upon the perfection of magnetic coupling in the transformer.

In comparison, the hybrid circuit disclosed in the above noted copending application uses a resonant transfer mode of operation wherein the power losses are substantially eliminated. Additionally, the circuit components are greatly simplified and balancing networks and other function limiting components are eliminated.

SUMMARY OF THE INVENTION

The resonant transfer hybrid disclosed in the aforementioned application has in addition to the foregoing certain unique features and characteristics from which flow the realization of the present invention. The hybrid used herein has a very wide bandwidth capability limited only by the speed of the resonant transfer gates. This range is much greater than the hybrid balance capability of the conventional hybrid. The signals at the transmit and receive ports need not be at the same frequency as the line signal. As an operating phenomenon of the instant resonant transfer hybrid, the signals in the transmit and receive paths will not only have the basic information of their counterparts in the line signal, but the respective transmit and receive signals will repeat as sidebands at multiples of the sampling frequency, i.e., the frequency of operation of the resonant transfer gates. Coupled with the foregoing, the present circuit makes use of this phenomenon in obtaining frequency division multiplexing of a plurality of line signals.

As will be more clearly hereinafter understood, such multiplexing is obtained in accordance with the present invention, given the basic resonant transfer hybrid structure, by merely selecting the passband characteristics of the resonant transfer filters in the transmit and receive paths so as to distribute the several signals at different portions of the frequency spectrum for simultaneous transmission. No auxiliary modulator, per se, is required. The transfer gate operation alone provides the full required frequency spectrum. This arrangement is in dramatic contrast to the conventional multiplexing circuit which requires a separate carrier frequency for each channel.

Additionally, in the conventional modulation process, the unwanted sidebands out of the modulator are reflected from the bandpass filter back through the modulator and are remodulated. This causes problems with the channel response. In order to decrease the effect of the reflected signal, it is usually necessary to insert a fixed attenuator of about 6 dB between the modulator and the bandpass filter. This loss plus losses inherent in the modulator, usually require the use of individual channel transmit and receive amplifiers. In the present resonant transfer process, use is made of the reflected sidebands since the hybrid lowpass and bandpass filters are designed as a single entity resulting in a theoretically zero-loss modulator. The need for individual channel amplifiers and the fixed attenuator is eliminated.

Accordingly, it is an object of the present invention to provide a combination hybrid and frequency division multiplexing circuit which preserves the inherent advantages of the resonant transfer hybrid including nearly lossless energy transfer to and from the transmit and receive paths, in a simple, highly effective and dependable structure, while at the same time obtaining the desired frequency division multiplexing of the signals with a minimum addition of circuit components.

Another object of the present invention is to provide a combination resonant transfer hybrid, frequency division multiplexing circuit of the character described which will produce undistorted, well-defined sidebands and afford the choice of either single sideband or double sideband transmission.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DESCRIPTION OF THE PREFERRED EMBODIMENT

Figure 1:
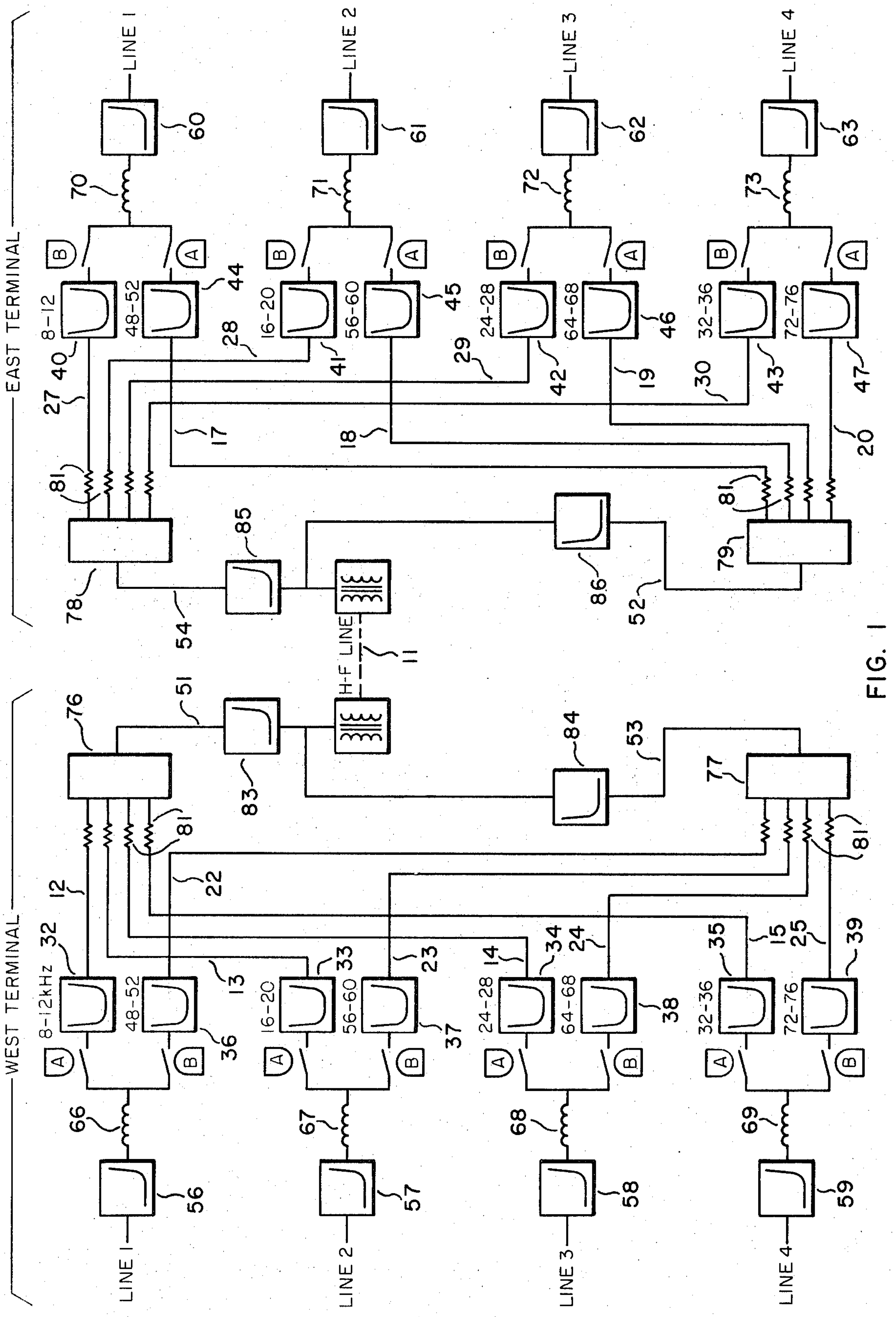
FIG. 1 is a schematic block diagram of a combination resonant transfer hybrid, frequency division multiplexing circuit constructed in accordance with the present invention.

A two-way communication system is illustrated in FIG. 1 depicting a west terminal and an east terminal connected by a high frequency line 11 and each having a plurality of lines here denoted lines 1 – 4. A hybrid circuit is used for each of the lines to separate the signals emanating from the respective terminals. These hybrids are of the two-to four-wire type establishing individual transmit and receive paths for the lines. Heretofore the moving of the four-wire side up to high frequency for multiplexing has required a separate modulation step. Insofar as applicant is aware, no one has ever constructed a hybrid circuit which in itself came out with the high frequencies required for multiplexing. In accordance with the present invention, such high frequency generation is attained as a byproduct of the resonant transfer means used for effecting hybrid separation of the several lines 1 – 4 into the plurality of transmit paths 12, 13, 14, and 15 of the west terminal; 17, 18, 19, and 20 of the east terminal; and receive paths 22, 23, 24, and 25 of the west terminal, and 27, 28, 29, and 30 of the east terminal. Gates and driving means therefor, here denoted by letters A and B, are connected in the transmit and receive paths of each of the hybrids and in accordance with the well-known Nyquist theorem are operated at at least two times the highest line message frequency of interest. A plurality of bandpass filters 32, 33, 34, and 35 are connected in the transmit paths 12 – 15; bandpass filters 36, 37, 38, and 39 are connected in the receive paths 22 – 25; bandpass filters 40, 41, 42, and 43 are connected in the receive paths 27 – 30; and bandpass filters 44, 45, 46, and 47 are connected in the transmit paths 17 – 20. As a feature of the present invention these bandpass filters have passbands distributed at multiples of the sampling frequency of gates A and B and are connected to common transmit channels 51 and 52 and common receive channels 53 and 54 which are in turn connected to high frequency line 11 to provide frequency division multiplexing of the several paths.

To complete the hybrid circuits a plurality of lowpass filters 56, 57, 58, and 59 are connected in each of lines 1 – 4 of the west terminal, and lowpass filters 60, 61, 62, and 63 are connected in each of lines 1 – 4 of the east terminal. A pair of the aforementioned bandpass filters 32 – 47 are connected in parallel to each bypass filter 56 – 63 for providing the separate transmit and receive paths for each of the lines. These bandpass filters need be compatible with the lowpass filters for operation in a resonant transfer mode. One of the gates A – B is connected between each bandpass filter and its associated lowpass filter and the driving means for the gates functions to close the gates for periods providing resonant transfer of energy between each of the lowpass filters and its associated pair of bandpass filters. The sequence of these gates is such that the closing of the receive path gate occurs as closely following as possible without significant overlap after the opening of the associated transmit path gate. The resonant transfer circuits are completed by the inclusion of resonant transfer inductors 66, 67, 68, 69, 70, 71, 72, and 73 in series with the line or lowpass filters 56 – 63 as shown in FIG. 1. For simplicity, illustration, and understanding, the two- to four-wire hybrid is illustrated in single wire form, that is, one- to two-wire form in the drawings. For fuller disclosure of the resonant transfer hybrid circuit see the above noted copending application.

Briefly, a message signal such as a voice current, originating at west terminal line 1 passes through filter 56 and is converted by means of the resonant transfer mechanism into a sequence of pulses. As an important phenomenon utilized in the present invention, this sequence is in effect a pulse-amplitude modulation of the input signal $f_v$ and the gate drive signal $f_s$. Thus, the pulse sequence in the frequency domain has the spectrum $\sin 2\pi(kf_s \pm f_v)t$. In other words, $f_v$ appears as sidebands located about multiples of $f_s$. It is another significant feature of the resonant transfer hybrid that the signals at the transmit and receive ports need not be of the same frequency as the line signal. Thus, bandpass filters 32 – 47 may be used in the transmit and receive paths tuned to any of the sidebands at the several multiples of $f_s$. Accordingly, different portions of the frequency spectrum may be selected to provide simultaneous transmission of the several paths. The passbands of filters 32 – 47 may be selected for either single sideband or double sideband transmission. The only restriction imposed on the bandpass filter design is that it be conformable in the resonant transfer sense with the lowpass filters 56 – 63. Thus, the required apportionment of the frequency spectrum to the several paths necessary for frequency division multiplexing is obtained as a byproduct of the resonant transfer circuit simply by a suitable choice of the transmit and receive bandpass filters 32 – 47. No carrier frequencies are required.

Another important feature of the present hybrid circuit is the selection of the particular time displacement of operation of the transmit and receive gates A and B at theoretically zero microseconds. By reason of this arrangement, the hybrid can accommodate all types of resonant transfer filters including the specific impulse response zero type heretofore used in resonant transfer circuits. Also, hybrid resonant transfer circuits heretofore used have proposed only lowpass-to-lowpass filter operation. Accordingly, two important advantages are attained in the present hybrid circuit. One is nearly lossless transmission of energy, and a second is the use of the passband array in the transmit and receive paths which afford frequency division multiplexing as above explained.

As another feature of the present invention, the connection of the several bandpass filters 32 – 47 to the common transmit and receive channels 51 – 54 is effected through amplifiers 76, 77, 78, and 79 with each of the transmit and receive paths being connected to its respective amplifier through a terminating resistor 81. Normally, amplifiers 76 and 78 have essentially zero input impedance and amplifiers 77 and 79 have essentially zero output impedance. This feature in conjunction with terminating resistors 81 provides a high degree of isolation between paths connected to the same amplifier. With reference to FIG. 1, it will be seen that all of the transmit paths 12 – 15 are connected to the input of amplifier 76 which is in turn connected to common transmit channel 51 while all of the receive paths 22 – 25 are connected through their terminating resistors 81 to the output of amplifier 77 which in turn has its input connected to common receive channel 53. Similarly, at the east terminal all of the receive paths 27 – 30 are connected through terminating resistors 81 to the output of amplifier 78 whose input is connected to common receive channel 54; and all of the transmit paths 17 – 20 are connected through their terminating resistors 81 to the input of amplifier 79 whose output is connected to common transmit channel 52. Thus, at the west terminal all of the transmit paths 12 – 15 are connected to common transmit channel 51 and all receive paths 22 – 25 are connected to common receive channel 53. Similarly, at the east terminal all receive paths 27 – 30 are connected to common receive channel 54, and all transmit paths 17 – 20 are connected to common transmit channel 52. By the selection of the frequency array in the several paths, common transmit channel 51 and common receive channel 53 may be combined at the west terminal for connection to high frequency line 11 by low and high group filters 83 and 84; and, similarly, the common receive and transmit channels 52 and 54 at the east terminal are combined for connection to the high frequency line through low and high group filters 85 and 86.

In the form of the invention illustrated in FIG. 1, bandpass filters 32 – 35 are selected of different passbands grouped for transmission by group filter 83; while bandpass filters 36 – 39 are selected of different passbands grouped for transmission by group filter 84. Either passband groups 32 – 35 or 36 – 39 may be selected to occupy a low portion of the frequency spectrum with the other group occupying a high portion of the frequency spectrum. As here shown, and by way of a specific example, filters 32 – 35 are selected:

| Filter No. | Passband kHz |
|---|---|
| 32 | 8 – 12 |
| 33 | 16 – 20 |
| 34 | 24 – 28 |
| 35 | 32 – 36 |

The bandwidth of the several filters corresponds with a 4 kHz voice current in lines 1 – 4. Lowpass filters 56 – 63 will, accordingly, have a high frequency cutoff at 4 kHz and gates A and B will be operated at 8 kHz.

Bandpass filters 36 – 39 may have the following passbands:

| Filter No. | Passband kHz |
|---|---|
| 36 | 48 – 52 |
| 37 | 56 – 60 |
| 38 | 64 – 68 |
| 39 | 72 – 76 |

As we observed from the foregoing tables, the transmit path filters 32 – 35 collectively occupy a low portion of the frequency spectrum, viz., 8 – 36 kHz; and the bandpass filters 36 – 39 in the receive paths collectively occupy a higher portion of the frequency spectrum, viz., 48 – 76 kHz. A 4 kHz guard band is here used between the channels to permit use of the simplest and most inexpensive filters. The use of more complex filter design and the deletion of the guard band would permit the doubling of the number of channels.

In keeping with the above frequency distribution, group filter 83 will be a low group filter having a passband of 8 – 36 kHz; and group filter 84 will be a high group filter having a passband of 48 – 76 kHz. The outputs of these two filters are then combined as illustrated and connected to high frequency line 11 which will have a bandwidth capacity of 8 – 76 kHz.

The bandpass filters 40 – 47 at the east terminal will be selected to have passbands corresponding with their respective counterparts at the west terminal. Thus, filters 40 – 43 in the receive paths will have passbands of 8 – 12, 16 – 20, 24 – 28, and 32 – 36 kHz, respectively; and filters 44 – 47 in the transmit paths will have passbands of 48 – 52, 56 – 60, 64 – 68, and 72 – 76 kHz, respectively. In this arrangement group filter 85 in common receive channel 54 will pass the low portion of the frequency spectrum, viz., 8 – 36 kHz; and group filter 86 in the common transmit channel will pass the high portion of the frequency spectrum, viz., 48 – 76 kHz. In the foregoing arrangement it will be noted that no additional modulation of any of the channels is required over and above that received as an inherent operation of the resonant transfer hybrid.

Figure 2:
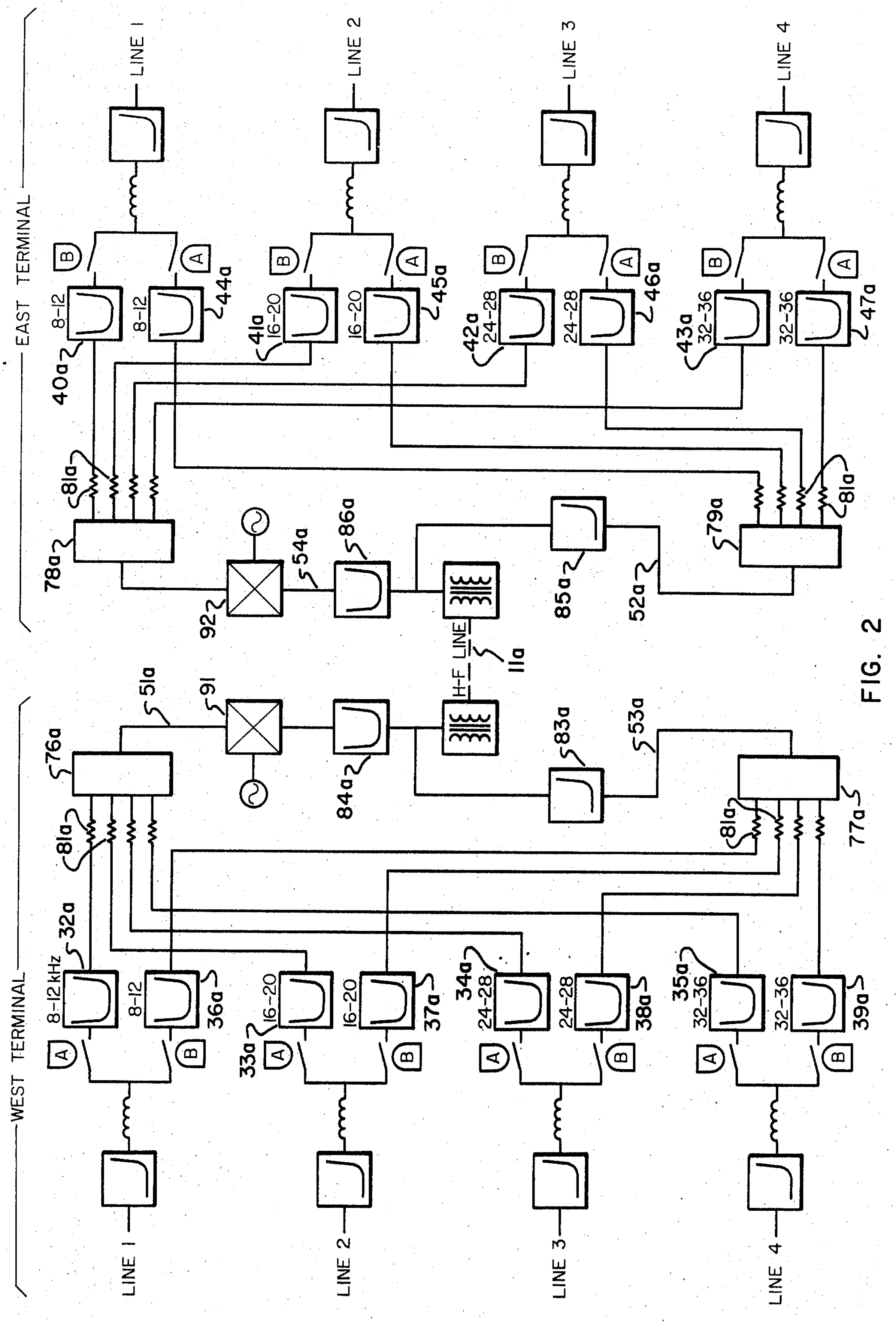
FIG. 2 is a schematic block diagram of a modified form of the invention.

A modified form of the invention is illustrated in FIG. 2 of the drawings wherein, for convenience and economy, identical pairs of bandpass filters are used in the receive and transmit paths of each hybrid and the receive and transmit channels allocated to a designated portion of the frequency spectrum by modulating one of the channels. With reference to FIG. 2, bandpass filters **32*a* and 36*a* in the hybrid for line 1, west terminal, and filters 40*a* and 44*a* in the hybrid of line 1, east terminal, may both have a passband of 8 to 12 kHz. Similarly, filters 33*a* and 37*a* of the hybrid of line 2, west terminal, and filters 41*a* and 45*a* of hybrid of line 2, east terminal, may have a bandpass of 16 to 20 kHz; filters 34*a* and 38*a* of hybrid for line 3, west terminal, and filters 42*a*, and 46*a* of hybrid line 3, east terminal, may have a bandpass of 24 – 28 kHz; and filters 35 *a* and 39*a* of hybrid of line 4, west terminal, and filters 43*a* and 47*a* of hybrid line 4,** east terminal, may have a bandpass of 32 – 36 kHz.

The several transmit paths of the west terminal are connected through terminating resistors **81*a* to the input of a common amplifier 76*a* whose output is connected to a common transmit channel 51*a*; and all of the receive paths at east terminal are connected through terminating resistors 81*a* to the output of amplifier 78*a* as in the first embodiment. In a similar fashion, all of the receive paths of the west terminal and all of the transmit paths of the east terminal are connected through terminating resistors 81*a* to their respective amplifiers 77*a* and 79*a*, and the latter are connected to common receive and transmit channels 53*a* and 52*a* as in the first embodiment. In this arrangement it will be seen that while the several transmit and receive paths are separated from each other by at least 4 kHz, the transmit and receive paths are presented as similar groups at their respective common channels 51*a* – 54*a* having the same selective bandpass, viz., 8 – 36 kHz. Under the circumstances, appropriate modulation and demodulation of one of the common channels at the respective terminals is used to obtain frequency separations. In the present circuit, modulator 91 is inserted in common transmit channel 51*a* of west terminal, and a demodulator 92 is inserted in common receive channel 54*a* of east terminal. Modulator 91 may raise the transmit group, east terminal, to 48 – 76 kHz so that the transmit group will occupy an upper portion of the frequency spectrum leaving the west terminal. Accordingly, the modulated common transmit channel is connected to high frequency line 11*a* through a high group filter 84$a$ and the unmodulated common receive channel 53$a$ is connected to high frequency line 11$a$ through low group filter 83$a$. At east terminal, the receive and transmit groups are separated from the high frequency line by high and low group filters 86$a$ and 85$a$ connected to the common transmit and receive channels 52$a$ and 54$a$. The receive group in channel 54$a$ is demodulated by demodulator 92 to shift the position of the receive group in the frequency spectrum back to the original group band 8 – 36 kHz and passed on to amplifier 78**$a$ and thence to the several receive paths of the several hybrids at east terminal.

Any suitable means may be used for driving gates A and B in their requisite fashion, viz., to close and open each gate at a sampling frequency equal to at least two times the highest message frequency of interest to be transmitted by the system, close each gate for a time period sufficient to effect resonant transfer of energy, and to close each receive path gate as closely following as possible without significant overlap after the opening of the associated transmit path gate. All of the transmit gates may be operated in unison for simplicity and similarly all of the receive gates may be operated in unison. For a specific gate driving circuit, see the aforementioned copending application.

What is claimed is:

1. In a two-way communications system, a system terminal having a plurality of lines, a plurality of resonant transfer hybrid means for effecting separation of two-way line signals into a plurality of transmit and receive paths comprising:

gating means connected one in each path;

driving means operating said gating means, at a sampling frequency which is at least two times the highest line frequency of interest and sequentially closing each receive path gate as closely following as possible without significant overlap after the opening of the associated transmit path gate; and, a plurality of bandpass filters connected one in each of said transmit and receive paths, compatible with resonant transfer operation and having passbands distributed at multiples of said sampling frequency for frequency-division multiplex operation.

2. A system as defined in claim 1 and further including:

a plurality of lowpass filters, connected one in each line, compatible with resonant transfer operation, and having frequency bandwidths the same as the frequency bandwidth of said bandpass filters.

3. A system as defined in claim 1:

a common transmit channel connected to the outputs of said bandpass filters in said transmit paths; and a common receive channel connected to the inputs of said bandpass filters in said receive paths.

4. A system as defined in claim 3:

an amplifier having an input connected to said filter outputs in said transmit paths and an output connected to said common transmit channel; and an amplfier having an input connected to said common receive channel and an output connected to said inputs of said receive path filters.

5. A system as defined in claim 4; and terminating resistors connected one between each transmit path and the input of said first named amplifier, and one each between each receive path and the output of said second named amplifier.

6. A system as defined in claim 4:

a first high-frequency line connected to said common transmit channel; and a second high frequency line connected to said common receive channel.

7. A system as defined in claim 6 further comprising:

a second terminal having a second common receive channel connected to the first high frequency line, and having a second common transmit channel connected to said high frequency line; and second terminal having a plurality of second lines and comprising:

second bandpass filters compatible with resonant transfer operation and connected to said second receive channel and having passbands coresponding to the passbands of said filter in said transmit paths of said first-named terminal and providing a plurality of receive paths at said second terminal;

third bandpass filters compatible with resonant transfer operation and connected to said second transmit channel and having passbands corresponding to the passbands of said filters in the receive paths of said first-named terminal and providing a plurality of transmit paths at said second terminal; and second resonant transfer hybrid means connected to said second and third bandpass filters and recombing the receive and transmit paths thereof into second lines, said second resonant transfer hybrid means having characteristics corresponding to said first-named resonant transfer hybrid means.

8. A system as defined in claim 3:

low group and high group filters connected to said common transmit and receive channels; and a high frequency line connected to said low and high group filters.

9. A system as defined in claim 8 wherein a second terminal is connected to said high frequency line, said second terminal having a plurality of second lines and comprising:

low and high group filters at said second terminal and connected to said high frequency line for furnishing second receive and transmit channels;

second bandpass filters, compatible with resonant transfer operation, connected to said second receive channel and having passbands corresponding to the passbands of said filters in said transmit paths of said first-named terminal and providing a plurality of receive paths at said second terminal;

third bandpass filters, compatible with resonant transfer operation and connected to said second transmit channel and having passbands corresponding to the passbands of said filters in the receive paths of said first-named terminal and providing a plurality of transmit paths at said terminal; and second resonant transfer hybrid means connected to said second and third bandpass filters and recombining the receive and transmit paths thereof into second lines, said second resonant transfer hybrid means having characteristics corresponding to said first-named resonant transfer hybrid means.

10. A system as defined in claim 9 wherein said last-named resonant transfer hybrid means further comprises:

second gating means connected one in each path;

second driving means operating said second gating means, said second driving means having characteristics corresponding to said first-named driving means; and a plurality of lowpass filters, connected one in each of said second lines, compatible with resonant transfer operation, and having frequency bandwidths the same as the frequency bandwidth of said second and third-named bandpass filters.

11. A system as defined in claim 10:

a first amplifier having an input connected to said filter outputs in said transmit paths of said first named terminal and having an output connected to said common transmit channel;

a second amplifier at said first named terminal having an input connected to said common receive channel and an output connected to said inputs of said receive path filters;

a third amplifier at said second terminal having an input connected to the receive group filter and an output connected to said second bandpass filters; and a fourth amplifier having an input connected to said third bandpass filters and an output connected to said transmit group filter.

12. A system as defined in claim 11, and terminating resistors connected one between each of said bandpass filters and its associated amplifier.

13. A system as defined in claim 8 wherein:

said bandpass filters, connected in said transmit path, have passbands distinct and separate from each other, and grouped for transmission by one of said group filters; and said bandpass filters connected in said receive path, have passbands distinct and separate from each other and grouped for transmission by the other of said group filters.

14. A system as defined in claim 13 wherein a second terminal is connected to said high frequency line, said second terminal having a plurality of second lines and comprising:

a second set of low and high group filters corresponding with said first-named group filters and connected to said high frequency line for furnishing said receive and transmit channels;

second bandpass filters compatible with resonant transfer operation and connected to said second receive channel and having passbands corresponding to the passbands of said filters in said transmit paths of said first-named terminal and providing a plurality of second receive paths;

third bandpass filters compatible with resonant transfer operation and connected to said second transmit channel and having passbands corresponding to the passbands of said filters in said first terminal receive paths and providing a plurality of second transmit paths; and second resonant transfer hybrid means connected to said second and third bandpass filters and recombining the receive and transmit paths thereof into said second lines, said second resonant transfer hybrid means having characteristics corresponding to said first-named resonant transfer hybrid means.

15. A system as defined in claim 8:

said bandpass filters being arranged in pairs corresponding in number of pairs with the number of said resonant transfer means, one filter of each pair being connected in the transmit path and the other filter of each pair being connected in the receive path of each resonant transfer means;

the filters comprising each pair having common passbands, and the several filter pairs having passbands distributed at multiples of said sampling frequency; and a modulator connected to one of said channels.

16. A system as defined in claim 15:

a second terminal connected to said high frequency line and having a plurality of second lines and comprising:

second low and high group filters having passbands corresponding with said first-named group filters and connected to said high frequency line and furnishing second receive and transmit channels;

second bandpass filters compatible with resonant transfer operation and connected to said second receive channel and having passbands corresponding to the passbands of said filters in said transmit paths of said first-named terminal and providing a plurality of second receive paths;

third bandpass filters compatible with resonant transfer operation and connected to said transmit channel and having passbands corresponding to the passbands of said filters in said first terminal receive paths and providing a plurality of second transmit paths;

a demodulator connected to the one of said second channels corresponding to the modulated first-named channel and providing a demodulation corresponding with the modulation produced by said modulator; and second resonant transfer hybrid means connected to said second and third bandpass filters and recombining the receive and transmit paths thereof into second lines, said second resonant transfer hybrid means having characteristics corresponding to said first-named resonant transfer hybrid means.

17. The method of obtaining a combination hybrid and frequency division multiplex function in a two-way communication terminal having a plurality of lines comprising:

effecting a hybrid separation of each of said lines by resonant transfer between line filters and transmit and receive path filters by sampling in said paths at the sampling frequency of at least two times the highest line frequency of interest, and a sampling occurring sequentially in each receive path as closely following as possible without significant overlap after the sampling and the associated transmit path; and selecting passbands for at least certain of said transmit and receive path filters which differ from each other by multiples of said sampling frequency.

18. The method defined in claim 17:

connecting the outputs of said bandpass filters in said transmit paths to a common transmit channel; and connecting the inputs of said bandpass filters in said receive paths to a common receive channel.

19. The system defined in claim 18:

and combining said channels into a high frequency line through low group and high group filters.

20. The method defined in claim 19 and which further comprises:

connecting a second terminal having a plurality of second lines to said high frequency line;

separating said high frequency line at said second terminal into second receive and transmit channels having passbands corresponding to the transmit and receive channels, respectively, of said first terminal;

extracting from said second channels a plurality of discrete receive and transmit paths equal in number and having passband characteristics corresponding to said first-named transmit and receive paths, respectively; and effecting a hybrid separation of said second paths to said second lines by a resonant transfer method corresponding to said first-named hybrid separation method.

21. The method of claim 19:

selecting the passbands of said transmit path filters to correspond to the passband of one of said low/high group filters; and selecting the passbands of said receive path filters to correspond to the passband of the other of said low/high group filters.

22. The method of claim 19:

selecting said bandpass filters of pairs equal in number to the number of said lines, one filter of each pair being connected in the transmit path and the other filter of each pair being connected in the receive path for each line;

selecting common passbands for the filters of each of said pairs and passbands distributed in multiples of said sampling frequency for the several filter pairs; and providing additional modulation for one of said channels.

23. In a two-way communications system, a system terminal arranged for the simultaneous transmission of a plurality of line signals by frequency-division multiplexing, which comprises:

a plurality of two-way lines;

a plurality of transmit and receive paths;

a plurality of resonant transfer hybrid means connected to said lines for effecting separation of two-way line signals into said transmit and receive paths, said hybrid means comprising:

gating means connected one in each path;

driving means operating said gating means, at a sampling frequency which is at least two times the highest line frequency of interest; and a plurality of bandpass filters compatible with resonant transfer operation, having passbands distributed at multiples of said sampling frequency for frequency-division multiplex operation, and said bandpass filters connected one in each of said transmit and receive paths and operatively connected to said gating means.

24. A system as defined in claim 23 and further including:

a plurality of lowpass filters, connected one in each line, compatible with resonant transfer operation, and having frequency bandwidths the same as the frequency bandwidth of said bandpass filters.

25. A system as defined in claim 24 and further comprising:

a common transmit channel connected to the outputs of said bandpass filters in said transmit path; and a common receive channel connected to the inputs of said bandpass filters in said receive path.

26. A system as defined in claim 25 and further comprising:

means for combining the common transmit channel and the common receive channel to a single high-frequency line.

27. The method of obtaining a combination resonant transfer hybrid and frequency-division multiplex function in a two-way communication system having a plurality of lines and comprising:

effecting a hybrid separation of each of said lines by resonant transfer between line lowpass filters and transmit and receive path bandpass filters by sampling in said paths at a sampling frequency of at least two times the highest line frequency of interest; and selecting passbands for at least certain of said transmit and receive path bandpass filters which differ from each other by multiples of said sampling frequency.

28. The method defined in claim 27 and further including connecting the outputs of said bandpass filters in said transmit path to a common transmit channel; and connecting the inputs of said bandpass filters in said receive path to a common receive channel.

29. The method defined in claim 28 and further comprising:

combining said common transmit channel and said common receive channel into a common high-frequency line.

* * * * *